Sept. 29, 1964

F. F. HINES 3,151,306

ELECTRICAL STRAIN TRANSDUCER

Filed Aug. 25, 1961

INVENTOR.
Frank F. Hines
BY
Attorney

United States Patent Office 3,151,306
Patented Sept. 29, 1964

3,151,306
ELECTRICAL STRAIN TRANSDUCER
Frank F. Hines, Arlington, Mass., assignor to Baldwin-Lima-Hamilton Corporation, a corporation of Pennsylvania
Filed Aug. 25, 1961, Ser. No. 134,025
3 Claims. (Cl. 338—5)

This invention relates to an improved load-sensing element employing a gage responsive to surface strains of the element induced by an applied axial load and that is particularly adapted either for measuring such strains or for calibrating strain gages especially of the bonded electrical resistance filament type.

It is customary in using strain gages in materials testing to place them upon the exterior surfacec of a tension or compression specimen of material, preferably using two gages located on opposite sides of the specimen so that by averaging the readings of the two gages any bending effects therein will be compensated and thus provide a true average response. No matter how much care is used in applying tension load to a specimen there is inevitably some bending introduced into the specimen. Even though the bending effects of the specimen are compensated out by the use of gages on opposite sides, yet this arrangement does not permit a true calibration of the individual gages because they are individually subjected to bending. Where the gages are to be calibrated individually they are inherently subject to the possibility of a bending error in the specimen. The same bending errors are usually present when a gage is used for measuring axial strains in a load-sensing element of a transducer since some bending is practically unavoidable.

It is an object of my invention to provide improved means for calibrating individual strain gages or for measuring axial strains in transducers without subjecting the gages to bending strains.

Another object is to provide an improved load-sensing element whereby a strain gage may be placed upon the external surface of the load-sensing element without subjecting the gage to bending errors upon application of an axial load to the element.

A further object is to provide an improved load-sensing element that will accomplish the foregoing objects in a relatively simple and economical manner combined with ruggedness and ease of application of the gage to the load-sensing element.

A still further object is to provide an improved method for determining the neutral surface of my load-sensing element.

Other objects and advantages will be more apparent to those skilled in the art from the following description of the accompanying drawings in which.

Figure 2:
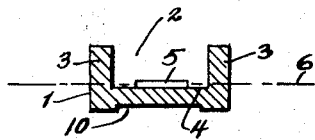
FIG. 2 is a section view taken substantially on the line 2—2 of FIG. 1.
Figure 1:
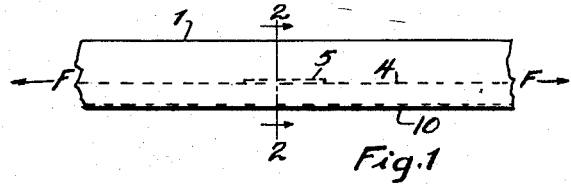
FIG. 1 is a side elevation of a load-sensing element employing my improved invention.

In the particular embodiment of the invention disclosed herein, I have shown the broad principle of my invention in FIGS. 1 and 2, wherein a calibration bar or load sensing element 1 has a longitudinal axis extending in the direction in which a force F is to be applied to the element and is longitudinally externally recessed at 2 to provide two side pieces 3. The recess 2 is of such depth that a "neutral surface" of the bar lies substantially on the actual plane bottom surface 4 which is a portion of the external surface of the element 1. When the well-known bonded electrical resistance filament type strain gage 5 is used, as by being bonded to surface 4, the depth of the recess 2 is such that the neutral surface is preferably at a predetermined distance externally from the surface 4 to allow for a portion of the thickness of the strain gage. The "neutral surface" is shown as at 6 and is defined (Roark's Formulas for Stress and Strain, McGraw-Hill Book Co., 1954) as the longitudinal surface of zero fiber stress in a member subject to bending. While gage 5 is relatively thin yet when it is attached to the calibration bar it is desirable that the gage be entirely free of bending when the member 1 is subjected to load. This is best accomplished by considering that the gage as attached to the force element has a plane in which the strain acting in such plane is response only to the magnitude of the applied force F. Such a plane might be termed the "force responsive plane" of the gage. When this gage plane coincides with the plane of the neutral surface 6 the gage is free of strains due to bending of said neutral surface along the direction of the bar axis. To determine whether the two planes are in coincidence so as to eliminate bending effects it is only necessary to bend the sensing element and see if the gage undergoes a change of resistance. If a change takes place, then it is desirable to shift the neutral surface. This can be accomplished by removing material from the element at an area disposed away from the neutral plane, preferably at a point furthest away. For example, to shift the neutral plane in one direction a small recess 10 may be cut either across piece 1 under gage 5 or longitudinally of the bottom of member 1, or to shift in the opposite direction the material may be removed from the top edges of flanges 3, 12, etc. The neutral surface of the force-sensing element is thereby shifted to obtain the necessary coincidence of the planes. It is possible to obtain the necessary coincidence when initially cutting the recess 2 provided the characteristics of gage 5 are sufficiently known.

Figure 3:
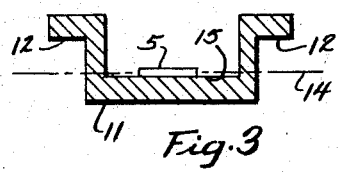
FIGS. 3 and 4 are cross-sections of modified forms of load-sensing elements.
Figure 4:
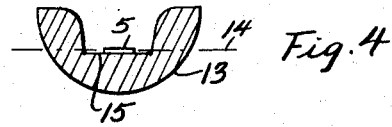

Various cross-sectional shapes of element 1 can be utilized. One such configuration is shown in FIG. 3 where the recessed load-sensing element 11 has lateral flanges 12 while in FIG. 4 the recessed element has a curved surface portion 13. The neutral surface in each case is shown as substantially along the plane surface 15 upon which a gage 5 is mounted. It will be understood that all of these figures are only diagrammatic inasmuch as it would be difficult to show accurately the position of the neutral surface which is usually located an extremely small distance externally from the gaging surfaces such as 4 and 15 or similar surfaces in the transducer figures to be described.

In the limiting case, the neutral surface 6 would coincide with the element surface 14. This would be true in the application of a strain gage such as the well-known Tuckerman gage to an element such as 1 because when the Tuckerman gage is applied to surface 14, its "force-responsive plane" lies exactly on plane 14 for all practical purposes.

Figure 6:
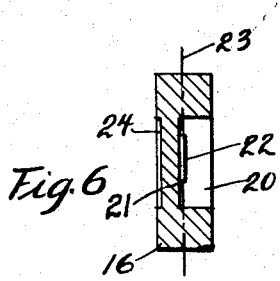
FIG. 6 is a sectional view taken on the line 6—6 of FIG. 5.
Figure 5:
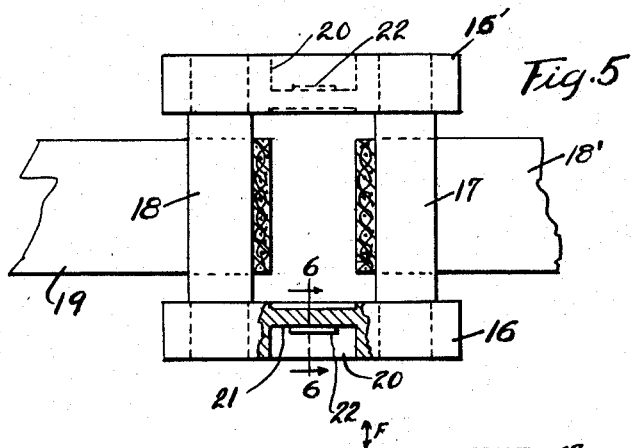
FIG. 5 is an elevational view partly broken away of a force measuring transducer of a type for measuring the force transmitted between two fabric straps.
Figure 8:
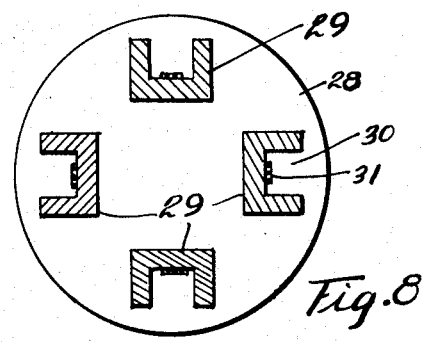
FIG. 8 is a sectional view taken substantially on the line 8—8 of FIG. 7.
Figure 7:
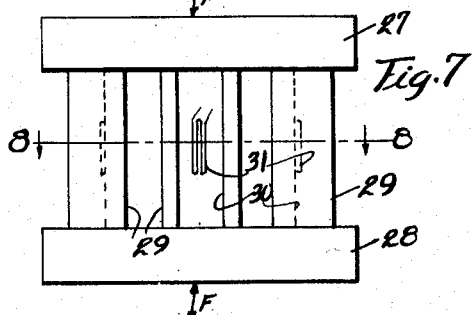
FIG. 7 is a compression and/or tension type of load cell.

Aside from utilizing my invention for performing the calibration of the gages I can also employ its principle in transducers of various types so as to eliminate bending effects on the gages. For instance, in FIG. 5 I provide a pair of links 16 and 16' connected by pins 17 and 18. Straps 18' and 19 which may be straps such as are used in parachute gear, are looped around the pins 17 and 18 so that a tension load in the direction of the straps may be applied to the links 16 and 16'. To determine the load actually imposed upon the straps 18' and 19 either during a test fall of a parachute or otherwise, I recess the links as at 20 to provide an external plane surface 21 upon which a strain gage 22 is mounted, preferably a bonded electrical resistance filament gage. As shown in FIG. 6 the depth of the recess is such that the neutral surface 23 lies slightly above the gage surface 21, so that the plane of the neutral surface coincides with the force responsive plane of the gages. Again, if it is necessary to adjust the neutral surface after the gage is installed, this can be done by removing a slight amount of metal from the back side of the links as indicated at 24. Cut 24 may run clear across the left face of element 16 in FIG. 6 if desired, or any other changes in cross-section can be used to shift the neutral surface to the desired position, as is well known. Links 15 and 16 can be constructed in the like manner if desired. In FIGS. 7 and 8 a so-called load cell of either the compression and/or tension type includes upper and lower plates 27 and 28 between which are interposed a load-sensing column or columns 29 each having a vertically extending recess 30 on the bottom surface of which gages 31 are mounted. The recess 30 is of such depth and width as to insure the coincidence of the neutral surface with the force responsive plane of the gage so as to eliminate bending effects on the gage and thus obtain a more accurate force measurement.

From the foregoing disclosure, it is seen that I have provided not only an extremely effective means for eliminating bending effects on a gage as applied to a load-sensing element, but have accomplished this in a highly simple and economical manner. While my structure has a simplicity and ease of application of the gage to the load-sensing element, yet these qualities have resulted in a precision force measuring and calibration structure where bending effects could not be effectively compensated out.

It will, of course, be understood that various changes in details of construction and arrangement of parts may be made by those skilled in the art without departing from the spirit of the invention, as set forth in the appended claims.

I claim:

1. A force-sensing element having an axis extending in which a force is to be applied to the element, said element having an external surface a portion of which is formed as a plane parallel to said axis and said element having a neutral surface lying in a plane which is parallel to and at a predetermined distance externally from said surface portion, a strain gage engaging said surface portion so as to be responsive to strains therein in the direction of said axis, and the gage having a thickness so that with the gage attached to said external surface of said element, the gage is disposed so that it has a force responsive plane that coincides with said plane of the neutral surface whereby the gage is free of strains due to bending of said neutral surface along the direction of said axis and is responsive only to the magnitude of said applied force.

2. The combination set forth in claim 1 further characterized in that the sensing element has an external recess with a bottom surface constituting the external surface portion engaged by the strain gage.

3. The combination set forth in claim 1 further characterized in that the sensing element has an external recess with a bottom surface constituting the external surface portion engaged by the strain gage, and the strain gage being of the bonded electrical resistance filament type with its force responsive plane located externally a predetermined distance from said bottom surface so as to coincide with the neutral surface.

References Cited in the file of this patent

UNITED STATES PATENTS

| | | |
|---|---|---|
| 2,813,958 | MacDonald | Nov. 19, 1957 |
| 2,984,102 | Soderholm | May 16, 1961 |